United States Patent [19]

Umezaki

[11] Patent Number: 4,980,993
[45] Date of Patent: Jan. 1, 1991

[54] METHOD AND APPARATUS FOR MANUFACTURING CONTACT LENS

[75] Inventor: Hideaki Umezaki, Suwa, Japan

[73] Assignee: Seiko Epson Corporation, Tokyo, Japan

[21] Appl. No.: 407,500

[22] Filed: Sep. 14, 1989

[30] Foreign Application Priority Data

Sep. 16, 1988 [JP] Japan .................................. 63-231969

[51] Int. Cl.⁵ ........................ B24B 49/00; B24B 49/02; B24B 49/03
[52] U.S. Cl. .................................. 51/165.71; 51/5 C; 51/125.5; 51/154; 51/284 E
[58] Field of Search ............ 51/165.72, 165.71, 284 R, 51/284 E, 5 C, 5 E, 62, 67, 154, 125, 125.5, 130; 82/1.11, 12, 13, 118, 124

[56] References Cited

U.S. PATENT DOCUMENTS

| | | | |
|---|---|---|---|
| 3,874,124 | 4/1975 | Morgan et al. | 51/284 R |
| 4,434,581 | 3/1984 | Spriggs | 51/284 R |
| 4,455,901 | 6/1984 | Council, Jr. | 82/284 R |
| 4,460,275 | 7/1984 | Spriggs | 51/165.72 |
| 4,787,732 | 11/1988 | Siviglia | 51/284 R |

Primary Examiner—Frederick R. Schmidt
Assistant Examiner—J. R. Schwarzmann
Attorney, Agent, or Firm—Blum Kaplan

[57] ABSTRACT

A method for manufacturing a contact lens from contact lens raw material to a desired shape and an apparatus for carrying out the method by forming a base curve and bevel in accordance with design data. The radius of curvature of the base curve is measured and the radius of curvature data of a front curve for forming a contact lens having a desired power is calculated. The front curve together with a lentic curve, if required, is formed based upon the calculated shape data. A soft abrasive cloth is pressed against the work contact lens by fluid pressure while causing relative motion therebetween to polish the contact lens.

8 Claims, 8 Drawing Sheets

METHOD AND APPARATUS FOR MANUFACTURING CONTACT LENS

BACKGROUND OF THE INVENTION

This invention relates to a method and apparatus for manufacturing contact lenses and, in particular, to a method and apparatus for manufacturing made to order contact lenses based upon design data relating to a patient's prescription or standard design data.

Figure 3A:
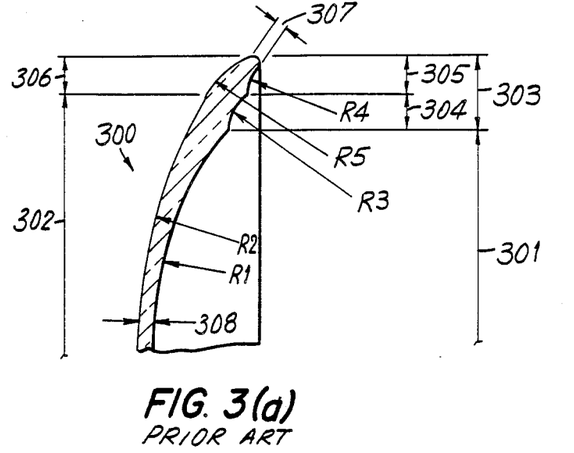
Figure 3B:
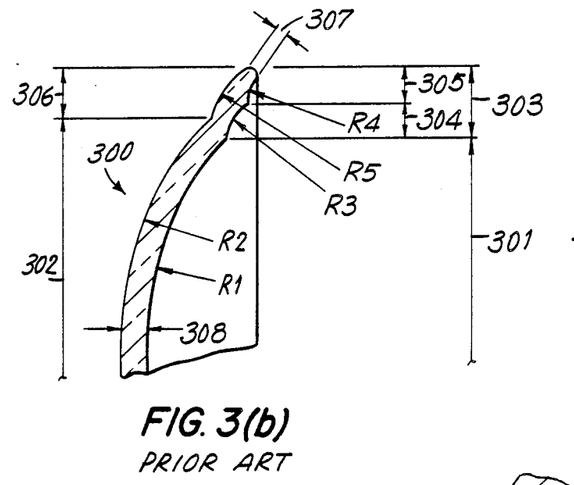

Generally, contact lenses known in the art have a shape as shown in FIG. 3(a) or as shown in FIG. 3(b). A lens 300 shown in FIG. 3(a) is a minus lens used primarily to correct the visual acuity of nearsightedness. Lens 310 of FIG. 3(b) is a plus contact lens used primarily to correct the visual acuity of hypermetropia.

As seen in FIGS. 3(a), 3(b), each contact lens 300, 310 has a curved surface 301 called a base curve on the inner side thereof and another curved surface 302 called a front curve on the opposite side. The radius of curvature $R_1$ of base curve 301 is determined to adapt to the shape of a patient's cornea, whereas the radius of curvature $R_2$ of the front curve 302 is determined on the basis of the radius of curvature $R_1$ of the base curve 301 and the power necessary for the patient. Minus power lens 300 has a relationship of $R_1 < R_2$, whereas plus power lens 310 has a relationship of $R_1 > R_2$. Where $R_1 = R_2$, the power is substantially zero D (diopter).

A curved surface bevel 303 is formed on the circumference of base curve 301. Bevel 303 generally consists of a curved surface 304 known as the secondary curve and another curved surface 305 known as the peripheral curve.

Figure 4:
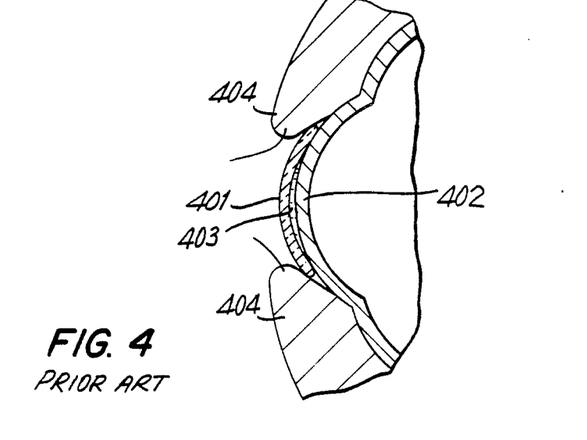
FIG. 4 is a sectional view of a prior art contact lens fitted in an eye.
Figure 5:
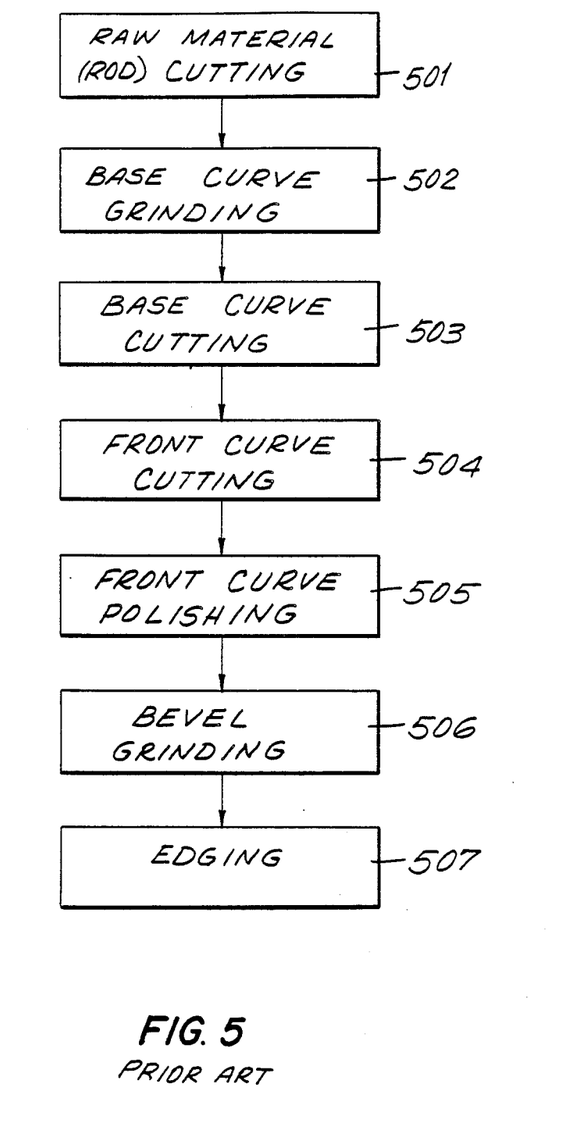
FIG. 5 is a flowchart for a contact lens manufacturing method in accordance with the prior art.

As shown in FIG. 4, a contact lens 401 is used normally in the state wherein a tear liquid 403 is interposed between contact lens 401 and a cornea 402. Since this tear liquid 403 has the important functions of surface cleaning and sterilization of cornea 402 and supplying oxygen thereto, tear liquid 403 lying between contact lens 401 and cornea 402 must be refreshed. Bevel 303 is provided to cause tear liquid 403 to smoothly flow in and out, making the vertical movement of the lens smooth. Accordingly, the shape of bevel 303 is determined based upon prescription data, such as the quantity of tear and the peripheral shape of the patient's cornea. Generally, the relationship of $R_1 < R_3 < R_4$ exists between the radius of curvature $R_1$ of base curve 301, the radius of curvature $R_3$ of secondary curve 304, and the radius of curvature $R_4$ of peripheral curve 305, but sometimes, the case of $R_1 < R_3 = R_4$ exists.

A curved surface 306 known as a lentic curve is formed on the circumference of front curve 302. Lentic curve 306 is provided to give a certain value to an edge thickness 307. Thus, its shape is determined based upon the radius of curvature $R_2$ of front curve 302 and the value of a center thickness 308. Generally, the relationship between the radius of curvature $R_2$ of front curve 302 and the radius of curvature $R_5$ of lentic curve 306 is $R_2 > R_5$ for minus power lens 300 and $R_2 < R_5$ for plus power lens 310. However, the relationship $R_2 = R_5$ sometimes exists.

Clinical testing shows that edge thickness 307, which significantly influences the patient's comfort is preferably set to about 0.08 to 0.11 mm for ordinary patients, or about 0.14 to 0.15 mm for patients of advanced age whose eyelid 404 has poor tension. The edge of the contact lens is finished to a smooth curved surface to prevent damage to the cornea. Similarly, the connecting portion between base curve 301 and bevel 303 and between front curve 302 and lentic curve 306 is finished to a smooth curved surface.

Originally, to produce a contact lens, design data for a desired shape was prepared based upon a patient's prescription data or a predetermined standard specification. Then, manufacture was carried out on the basis of this design data.

Figure 6A:
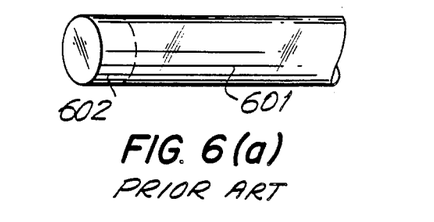

Reference is now made to FIGS. 5 and 6(a) through 6(e) in which a process for manufacturing a contact lens as known in the prior art is provided. The raw material for a contact lens is a polymer or copolymer of a high molecular monomer. This material is supplied in the form of a raw columnar rod 601 as shown in FIG. 6(a). The raw material rod is cut into a button 602 (FIG. 6(a)) having a thickness larger than a finally-required thickness in a step 501. If the raw material is supplied as button 602, this first step is omitted.

Figure 6B:
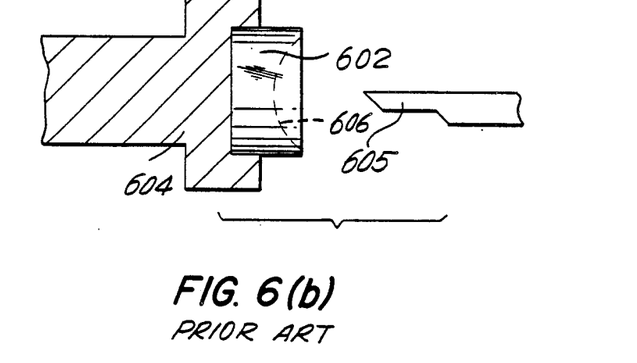

A base curve 606 (FIG. 6(b)) is cut into button 602 in a step 502. As shown in FIG. 6(b), button 602 is secured to a collet chuck 604 and cut using a cutting tool 605 attached to a high-precision CNC lathe or the like resulting in a base curve 606 of desired shape.

Figure 6C:
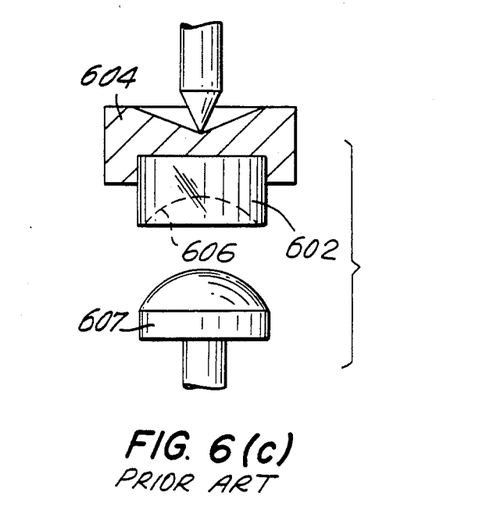

The surface of base curve 606 is polished to provide finish to the optical surface in a step 503. As shown in FIG. 6(c), polishing is carried out utilizing a particular polishing tool 607 whose surface shape is designed in accordance with the desired shape of base curve 606. Where the base curve is to have an aspheric surface, a very small polishing pad is sometimes used.

Figure 6D:
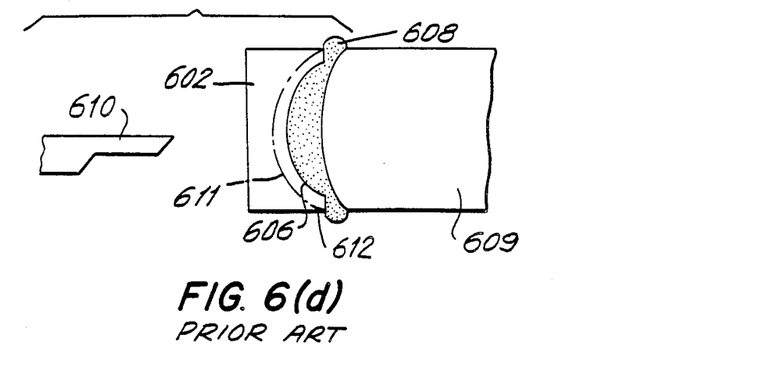

The surface opposite the base curve is ground to form a front curve 611 and a lentic curve 612 in a step 504. As shown in FIG. 6(d), the side of the base curve 606 is blocked to a mounting tool 609 with an adhesive agent 608 and cut by the use of a cutting tool 610 attached to the high-precision CNC lathe or the like, similar to forming the base curve, to form a front curve 611 and a lentic curve 612 of desired shape. Then, polishing is again carried out using a particular polishing tool designed in accordance with the front curve shape as when polishing base curve 606 to provide an optical surface in a step 505. When a desired shape or a desired lens power cannot be obtained due to errors occurring during machining of the base curve and/or front curve, grinding is sometimes carried out during the polishing step to change the lens shape thereby correcting the error. The thus obtained lens having a desired power is generally called an uncut lens.

Figure 6E:
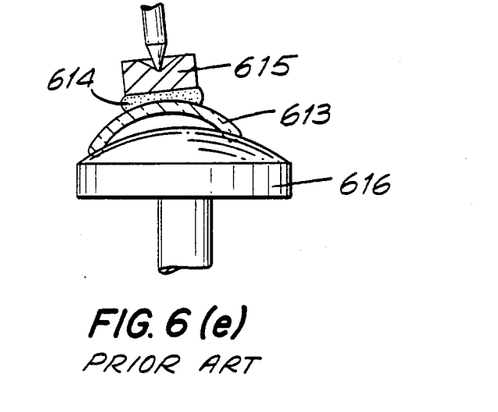

In a bevel grinding step 506, as shown in FIG. 6(e), an uncut lens 613 is blocked to a mounting tool 615 with an adhesive agent 614 or the like as seen in FIG. 6(e). A circumferential portion of uncut lens 613 is ground using a particular grinding tool 616 having a surface shape conforming to the patient's prescription data to form the desired shaped bevel. The circumference is cut to have a desired lens diameter. This step generally consists of forming the secondary curve, forming the peripheral curve, and cutting the circumference.

Finally, in an edging step 507, the edge and the blending portions between the individual curved surfaces are polished and ground to a finish to smooth the curved surfaces.

Since, the shape of the human eye differs from person to person, it is ideal to manufacture individual contact lenses to best adapt in shape to individual patients on the basis of the patient's prescription data. However, in view of the manufacturer's need for the efficiency of mass production to reduce the manufacturing cost and the user's demand for immediate use, a standard lens is manufactured to be used by many different patients. The present lens distribution system has adopted standard shapes adapted for a large number of patients. These standard shapes are prepared based upon clinical testing results. These standard products are previously manufactured and are stocked by optometrists and ophthalmologists and at retail stores.

One disadvantage with the prior art manufacture of the contact lens is that the manufacturing cost is extremely high. Accordingly, the above standardized system was introduced to enhance mass production efficiency and reduce the manufacturing cost by determining the specification of standard products. However, for typical standard products, the radius of curvature of the base curve varies within the range of 7.00 mm to 8.50 mm with a step of 0.05 mm, the power varies within the range of ±10.00 D with a step of 0.25 D, and the shape and outer diameter of the bevel, edge thickness, center thickness, etc. also vary. Therefore, the number of stock lens types which must be prepared approaches several thousand, resulting in multi-item small-quantity production. Thus, the productive efficiency is poor and it is impossible to reduce the manufacturing cost.

Further, even where a large number of standard product types are prepared, they can satisfy only about 90% of all patients, so that for the remaining 10% of the patients, it is necessary to manufacture each contact lens so as to have a specific shape adapted to each patient for each order. To satisfy each order, additional job specific tools conforming to individual shapes must be prepared, increasing the manufacturing cost and increasing the time necessary for settling the order. Another problem with manufacturing the prior art contact lenses is that it is difficult to maintain the required high degree of accuracy and the yield of manufacture is bad making it especially difficult to manufacture the contact lens having a desired power with high accuracy.

The power of the contact lens can be expressed strictly by a function of the radius of curvature $R_1$ of the base curve, the radius of curvature $R_2$ of the front curve and the center thickness. Conventionally, a simple method is adopted in which the difference between the surface refracting power of the front curve and the surface refracting power of the base curve is calculated. The surface refracting power d (Unit: D) of each curved surface may be expressed as $$d = 1000(n-1)/R$$

where n is the refractive index peculiar to a polymer or copolymer of high molecular monomer which is the raw material of the contact lens. This index varies depending on the composition of the raw material used, but it is roughly about 1.40 to 1.50. R is the radius of curvature in millimeters of the curved surface.

Assuming that the refractive index n of the contact lens raw material is 1.45 and the radius of curvature $R_1$ of the base curve is 8.00 mm, the surface refracting power $d_1$ of the base curve becomes $$d_1 = 1000(1.45-1)/8.00 = 56.25(D)$$

In this connection, to obtain a power of, for example, −2.00 D, the surface refracting power $d_2$ of the front curve must be 54.25 (D) (=$d_2$). Consequently, the front curve must be machined so as to have the following radius of curvature $R_2$:

$$R_2 = 1000(1.45-1)/54.25 = 8.295(mm)$$

However, the machining accuracy for the base curve and front curve is limited to about ±0.01 mm in terms of the radius of curvature even if the best-precision CNC lathe now available is used and strict accuracy management is practiced. That is, if an error of +0.01 mm occurs during the machining of the base curve and its radius of curvature $R_1$ becomes 8.01 mm, the resulting surface refracting power of the base curve becomes 56.18 D, resulting in an error of −0.07 D with respect to the design value. Since the allowable error of the power is ±0.12 D, the above error falls within the allowable range. However, if an additional −0.01 mm error occurs during the machining of the front curve and its radius of curvature $R_2$ becomes 8.285 mm, the surface refracting power of the front curve becomes 54.32 D, and the power of the lens becomes $$54.32 - 56.18 = -1.86(D)$$

This value shows an error of +0.14 D with respect to the design value, exceeding the allowable range of error.

In this way, the error of the power is an accumulation of the machining error arising during the machining of the base curve and the machining error arising during the machining of the front curve, so that the possibility of exceeding the allowable error is as high as about 50% to 60%, resulting in a bad yield. In the conventional lens manufacturing process, in order to overcome the foregoing drawback, at least one of the base curve and the front curve was ground to change the shape after the initial machining to correct the error of the power to fall within the allowable error limit, improving the yield. This technique is known in the art as "power change". This technique, however, inherently requires an additional step, thereby increasing the manufacturing cost. Further, since this technique is used to converge the power on an intended value, it is necessary to rely on the experience and expertise of skilled workers. Thus, no reliable accuracy can be attained.

Additionally, since the base curve and the bevel are portions which come into contact with the cornea of the patient's eye, their shapes are significant for improving the comfort of the contact lens. Additionally, they are important in preventing the movement of blood to the eye and eye inflammation resulting from contact lens use, thereby enhancing medical safety. These portions require strict accuracy in manufacture. However, because the machining of the bevel is carried out after the machining of the base curve and front curve in the conventional method shown in FIG. 5, the thickness of the contact lens raw material after machining the base curve and front curve is very small, about 0.08 to 0.15 mm, as described above. Upon the pressing of the grinding tool as shown in FIG. 6(e), its stress causes a deformation of the contact lens raw material, thereby preventing accurate formation of the bevel. Since this forming step has been previously performed based upon the degree of deformation determined from the long-term experience and expertise of skilled workers, this manufacturing method provides a very low productivity and a very bad yield.

Further, the polishing of the base curve, front curve, etc. has been previously carried out using job specific shaped polishing tools to maintain a demanded accuracy. Therefore, separate polishing tools must be prepared which are individually adapted in shape to the base curve, secondary curve, peripheral curve, front curve and lentic curve, thereby increasing the number of different polishing tools required. This increases the manufacturing cost, and requires changing the polishing tools upon the changing of the lens type, thereby lowering the productivity.

According to the conventional method, the base curve is machined and polished with the side of the front curve secured as shown in FIG. 6(b). The front curve and lentic curve are machined and polished with the side of the base curve blocked as shown in FIG. 6(d). Then, the bevel is machined with the side of the front curve again secured as shown in FIG. 6(e). Therefore, there are three steps for securing the contact lens raw material. Consequently, since the work of securing the lens also involves an error in relation to the securing position, this error is accumulated due to the repetition of the securing step three times. As a result, the possibility of the shape defectiveness arising from this securing position error, such as prism defectiveness and eccentric defectiveness, exceeding the allowable limit, lowers the yield. Since the shape of the base curve differs depending on the kind of lens, the securing position tends to shift when the side of the base curve is secured as shown in FIG. 6(d). As a result, the machining position of the front curve deviates, and the optical axis of the front curve comes out of agreement with that of the base curve; resulting in prism defectiveness and/or center thickness error which exceeds the allowable limit. Similarly, positional shift also tends to occur when the side of the front curve is secured as shown in FIG. 6(e). As a result, an eccentric defect arises, or the position of the bevel deviates eccentrically, thereby lowering the accuracy in shape of the bevel.

Accordingly, it is desired to provide an improved method and apparatus for manufacturing a contact lens which overcomes the disadvantages of the prior art devices described above.

SUMMARY OF THE INVENTION

Generally speaking, in accordance with the present invention a method and apparatus for manufacturing a contact lens is provided. To manufacture a contact lens, in accordance with the present invention a base curve and a bevel are machined into desired shapes based upon given design data. Then, the radius of curvature of the base curve is measured and the radius-of-curvature data of a front curve for attainment of a desired degree of correction is calculated. A second machining is performed to form the front curve in a desired shape based upon the calculated shape data.

A second contact lens manufacturing method according to the present invention includes the steps of first machining a front curve having a desired radius of curvature based upon given design data. The radius-of-curvature of the front curve is measured and the radius-of-curvature data of a base curve for attainment of a desired power is calculated. Then, a second machining step for forming the base curve and a bevel having desired shapes based upon the radius-of-curvature data is performed.

A third contact lens manufacturing method according to the present invention includes forming a base curve and a bevel having desired shapes by grinding contact lens raw material based upon given design data. The surfaces of the base curve and the bevel are polished by pressing a soft polishing cloth against the surfaces of the base curve and the bevel with fluid pressure and causing relative motion between the contact lens raw material (hereinafter referred to as a "work") and the polishing cloth. A front curve having a desired shape is formed by grinding based upon given design data. The surface of the front curve is polished by pressing a soft polishing cloth against the surface of the front curve with fluid pressure and causing relative motion between the contact lens raw material and the abrasive cloth.

A fourth contact lens manufacturing method according to the present invention includes forming a base curve and a bevel having desired shapes by cutting based upon given design data. The base curve and the bevel are polished. The contact lens raw material is bonded and blocked to a given mounting tool by discharging a necessary amount of adhesive agent between the polished surface of the base curve and the mounting tool. The necessary amount of adhesive agent is calculated based upon the shape of the base curve, the shape of the mounting tool and the height of adhesion. A front curve having a desired shape, and a lentic curve if necessary, are formed by cutting based upon given design data. The front curve, and the lentic curve if formed are polished. The edge of the contact lens raw material is edged to a smooth curved surface.

An apparatus for manufacturing contact lenses according to the present invention includes a specification data output circuit for selecting and providing one of a plurality of contact lens specification data sets based upon the prescription data of a patient's eyes and/or a predetermined standard specification. A first design data calculating circuit calculates first design data for machining a bevel to desired shapes based upon the specification data. A first machining tool forms the base curve and the bevel based upon the first design data. A radius-of-curvature measuring circuit measures the base curve and provides measurement data. A second design data calculating circuit calculates second design data for machining a front curve to desired shapes based upon the specification data and the measurement data. A second machining tool forms the front curve based upon the second design data.

A second contact lens manufacturing apparatus includes a specification data output circuit for selecting and providing one of a plurality of contact lens specification data sets based upon the prescription data of patient's eyes and/or a predetermined standard specification. A first machining data calculating circuit calculates first machining data for the machining of a front curve, to desired shapes based upon the specification data. A first machining tool forms the front curve based upon the first machining data. A radius-of-curvature measuring circuit measures the radius of curvature of the front curve and provides measurement data. A second machining data calculating circuit calculates a second machining data for the machining of a base curve and a bevel to desired shapes based upon the specification data and the measurement data. A second machining tool forms the base curve and the bevel based upon the second machining data.

Accordingly, it is an object of this invention to provide an improved apparatus for forming a contact lens as well as a method for utilizing that apparatus.

Another object of this invention is to provide an apparatus and method for quickly manufacturing any contact lens of a desired shape with high machining accuracy without increasing the manufacturing cost thereof.

Yet another object of the invention is to provide a simple apparatus and method for constructing a contact lens requiring fewer steps and fewer particularized tools.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3(*a*) is a fragmentary sectional view of a prior art minus contact lens;

FIG. 3(*b*) is a fragmentary sectional view of a prior art plus contact lens;

FIGS. 6(*a*) through (*e*) are schematic diagrams of several of the manufacturing steps of the prior art method of FIG. 5;

FIG. 9(*a*) is a sectional view of a polishing structure adapted to polish a base curve and a bevel in accordance with the present invention;

FIG. 9(*b*) is a sectional view of a polishing structure adapted to polish a front curve and lentic curve in accordance with the present invention;

DESCRIPTION OF THE PREFERRED EMBODIMENTS

Figure 1:
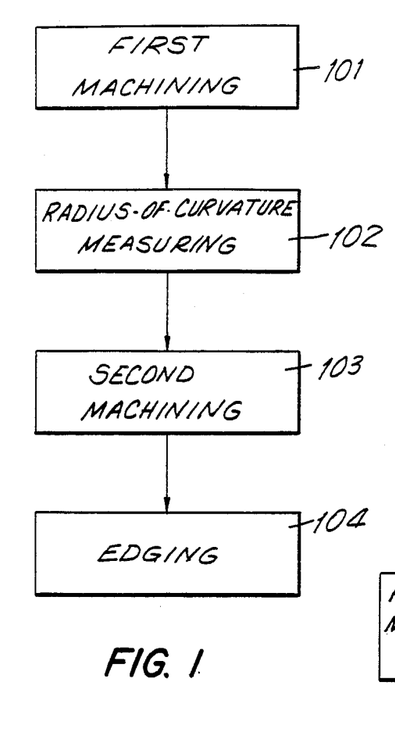
FIG. 1 is a flowchart for a contact lens manufacturing method in accordance with the present invention.

Reference is first made to FIG. 1 wherein a method for manufacturing a contact lens in accordance with the invention is presented. Specifically, design data relating to the shape of the contact lens, such as the desired degree of correction, radius of curvature of the base curve, radius of curvature of the front curve, diameter, center thickness, edge thickness, radius of the lentic curve, shape of the bevel, etc., is calculated based upon a predetermined standard specification and/or the prescription data of a patient's eyes. Then, in a first machining step 101, the base curve and the bevel are formed on the basis of the design data. In a radius-of-curvature measuring step 102, the radius of curvature of the base curve formed in first machining step 101 is measured. The design data of the front curve for constructing a contact lens having a desired power is calculated or the deviation from the foregoing design data is measured based upon the measurement data, and the design data of the front curve is calculated by amending the design data of the front curve.

In a second machining step 103, the front curve and the lentic curve are formed based upon the design data. Since the radius of curvature of the lentic curve sometimes becomes equal to the radius of curvature of the front curve, only the front curve is formed when the radii are equal. Finally, in an edging step 104, the shape of the edge is machined to a smooth curved surface, completing the contact lens.

A second manufacturing method in accordance with the invention is similar to the first manufacturing method. The primary difference between the two is that in the first machining step 101, the front curve, together with the lentic curve if necessary, is formed. Additionally, in radius-of-curvature measuring step 102, the radius of curvature of the front curve is measured and in second machining step 103, the base curve and the bevel are formed based upon the measurement result.

Although the first machining step 101 and the second machining step 103 generally are each composed of the grinding step of cutting the contact lens raw material and the polishing step of polishing the curved surface formed by cutting, it is not necessary to limit the process to them if a desired shape can be formed. Further, the edging step 104 can be omitted if the machining of the edge is adequately carried out concurrently with either first machining step 101 or second machining step 103.

A third machining method in accordance with the present invention is similar to the first manufacturing method. The primary difference between the two being that during the polishing in first machining step 101 and of the second machining step 103, a soft abrasive cloth deformable to any shape is pressed against the work while causing relative motion between the abrasive cloth and the work. It thus becomes possible to carry out polishing with the same materials and manhours with high accuracy irrespective of the contact lens shape.

A fourth manufacturing method in accordance with the present invention is similar to the first manufacturing method. The primary difference between the two is that when blocking the work to the given mounting tool for the purpose of forming the front curve and the lentic curve in second machining step 103, the necessary amount of adhesive agent is calculated based upon the shape of the base curve of the work, the shape of the mounting tool, and the height of adhesion necessary to machine and form the front curve at a proper position. Then, only the calculated amount of adhesive agent is discharged from a storage vessel to bond and block the work to the mounting tool, securing the work at a proper position with high accuracy irrespective of the shape of the base curve.

Figure 2:
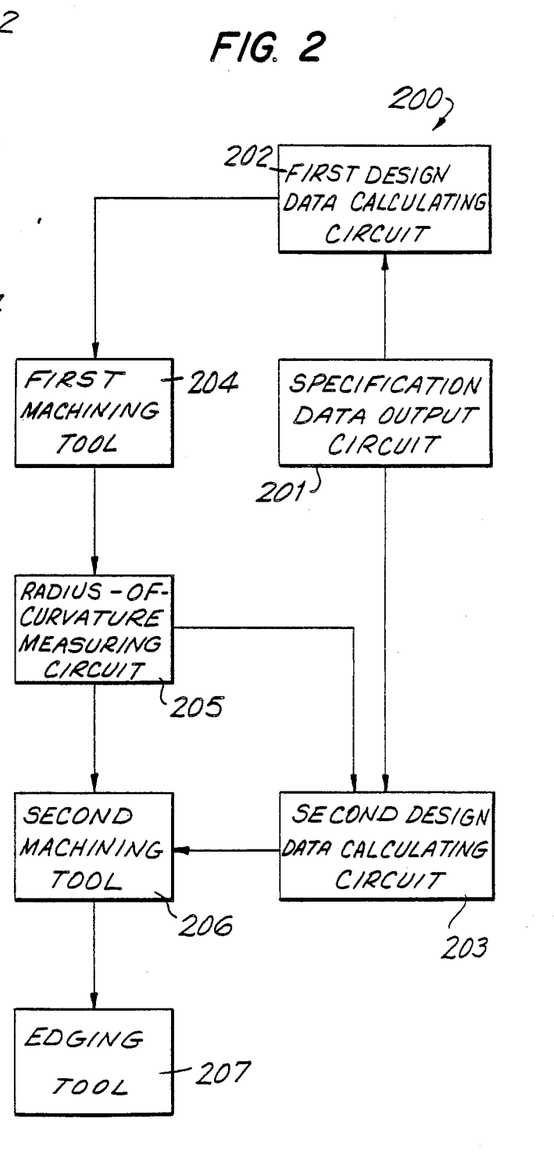
FIG. 2 is a block diagram of a contact lens manufacturing apparatus constructed in accordance with the present invention.

Reference is now made to FIG. 2 wherein an apparatus, generally indicated at 200, for manufacturing a contact lens in accordance with the above methods is provided. A specification data output circuit 201 selects, in accordance with a manufacturing sequence, one out of a plurality of previously entered specification data and outputs the selected data to a first design data calculating circuit 202 and a second design data calculating circuit 203. Based upon the specification data, first design data calculating circuit 202 calculates first design data for the machining of the base curve and the bevel to given shapes.

A first machining tool 204 machines the contact lens raw material to form the base curve and the bevel in accordance with the first design data and transports the machined contact lens raw material to a radius-of-curvature measuring circuit 205. Radius-of-curvature measuring circuit 205 measures the base curve, transfers this measurement data to the second design data calculating circuit 203, and transports the contact lens raw material after measurement to a second machining tool 206. Based upon the measurement data and specification data, second design data calculating circuit 203 calculates the second design data for the machining of the front curve, and the lentic curve if necessary, to given shapes. Second machining tool 206 receives the second design data and machines the contact lens raw material transported from radius-of-curvature measuring circuit 205 to form the front curve, and the lentic curve if necessary. Second machining tool 206 transports the machined contact lens raw material to an edging tool 207. An edging tool 207 machines the edge of contact lens raw material to a smooth curved surface, completing the contact lens.

A second embodiment of manufacturing apparatus constructed in accordance with the present invention is similar to apparatus 200. The primary differences between apparatus 200 and the second embodiment are that first design data calculating circuit 202 calculates first design data for the machining of the front curve, and the lentic curve if necessary, to given shapes. Accordingly, first machining tool 204 forms the front curve, and the lentic curve if necessary. Similarly, radius-of-curvature measuring circuit 205 measures the radius of curvature of the front curve and second design data calculating circuit 203 calculates second design data for the machining of the base curve and the bevel to given shapes based upon the measurement data and the specification data. Second machining tool 206 forms the base curve and the bevel.

Although the first machining tool 204 and second machining tool 206 generally include grinding tool for polishing a curved surface formed from the grinding, it is not necessary to limit these tools as long as they can form a desired shape. Further, edging tool 207 can be omitted if the first machining tool 204 or the second machining tool 206 is capable of concurrently carrying out the machining of the edge.

Further, an unmanned automated manufacturing line can be realized if the specification data calculating circuit 201, first design data calculating circuit 202, and second design data calculating circuit 203 are formed as a computer which includes a program for automatically calculating the necessary data. Additionally, the machining tool 204, radius-of-curvature measuring circuit 205, second machining tool 206, and edging tool 207 should be connected by a contact lens raw material auto-conveying structure.

Figure 7:
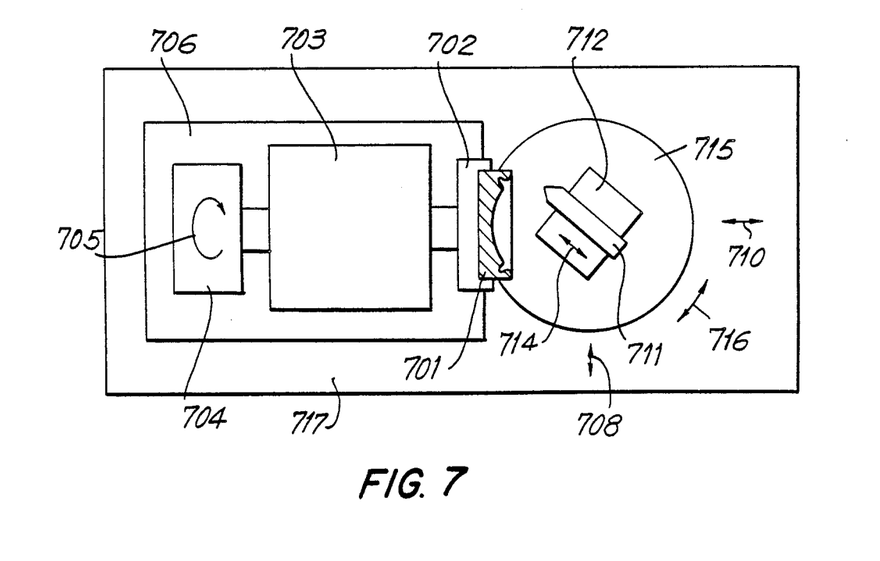
FIG. 7 is a diagram showing a precision CNC lathe used in a grinding step in accordance with the present invention.

Reference is now made to FIG. 7 wherein a precision CNC lathe, generally indicated at 700, used for cutting contact lens raw material in accordance with the present invention is provided. A stationary base 717 supports a shiftable table 706 and a rotary table 715. A tool table 712 is shiftably supported on rotary table 715 so that by rotating rotary table 715 in the direction of arrow 716, the coordinate position along the $\theta$ axis of the polar coordinate system where the rotational angle of tool table 712 is controlled. A cutting tool formed of diamond or the like is mounted on tool table 712 so that by shifting tool table 71 in the r-axis direction of the polar coordinate system or in the direction of arrow 714, the coordinate position along the r-axis of tool table 712 is controlled. An X-Y table 706 is mounted on stationary base 717. A spindle drive motor 704 is mounted on X-Y table 706. A collet chuck 702 is secured to a spindle 703. A spindle drive motor 704 rotates spindle 703 at a predetermined speed in the direction of arrow 705.

A work 701 to be machined is secured to collet chuck 702 in a manner similar to the conventional method shown in FIG. 6(b). Accordingly, work 701 is also rotated at a predetermined speed in a given direction by spindle drive motor 704. Additionally, by shifting X-Y table 706 in the direction of arrow 708, the X-axis direction, and in the direction of arrow 710, the Y-axis direction, the coordinate positioning of work 701 along the X-axis and the Y-axis is controlled. Therefore, by controlling the amount of shift (the rotational angle), the direction of shift (the direction of rotation), and the timing of shift for rotation of each of X-Y table 706, tool table 712, and rotary table 715 through the use of controls such as servo motors based upon given design data, it becomes possible to form the base curve, bevel, front curve and lentic curve for given shapes.

Figure 8:
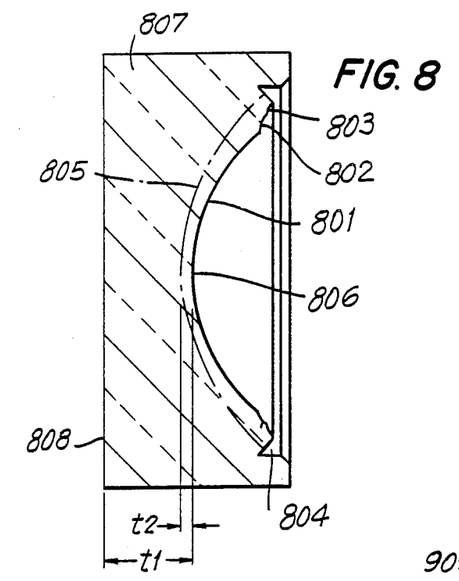
FIG. 8 is a side elevational view of a contact lens having a base curve and a bevel formed in accordance with the present invention.

FIG. 8 shows an example of a work 807 having a base curve 801 and bevel which were formed concurrently utilizing cutting tool 700. This example is a standard product whose base curve 801 and bevel were formed prior to forming a front curve and lentic curve. Work 801 is formed with a diameter of 9.0 mm, the base curve 801 of 7.80 mm, and a power of −4.00 D. In the case of standard products, other parameters, such as the shapes of the bevel and lentic curve, the center thickness, and the edge thickness, are determined in accordance with given design data based on the foregoing specification data. In this cutting step, as shown in FIG. 8, a groove 804 defining the diameter of the lens was formed concurrently with the formation of base curve 801, secondary curve 802, and peripheral curve 803 to define the bevel. Of course, the individual connecting portions between the base curve 801, secondary curve 802, and peripheral curve 803 are finished into smooth curved surfaces. This process is known as "blend".

A groove 804 is formed at a position such that when the front curve and lentic curve are formed in a subsequent step to correspond to dotted line 805, the outer diameter of work 801 becomes 9.05 mm. With this provision, it becomes possible to obtain a final outer diameter by forming the shape of the edge into a smooth curved surface through edge machining to 9.0 mm. Additionally, by forming base curve 801 so that a distance, $t_1$, from an optical center 806, the deepest portion of the base curve 801, to a front side end surface 808 of work 807 has a certain value, it becomes possible to finish the completed lens to have a center thickness $t_2$ of a design value. In an exemplary embodiment the distance $t_1$ is about 2 to 3 mm to prevent lens flexure or deformation during the machining of the base curve. However, $t_1$ may vary with the blocking method.

Utilizing cutting tool 701, it becomes possible to make the shape accuracy or surface waviness on the meridian of base curve 801 less than 0.15 $\mu$m. Thus, a value of $\pm 0.01$ mm was attained for the machining error of the radius of curvature.

Further, by concurrently cutting base curve 801 and the bevel or both secondary curve 802 and peripheral curve 803, it becomes possible to prevent the eccentricity of the bevel that was caused in the prior art. This is due to the difference between the blocking position to the fixture during the machining of the base curve and that during the machining of the bevel, thus making it possible to form the base curve and the bevel with very high shape accuracy.

The above example described the machining of the base curve and the bevel. However, the machining of the front curve and the lentic curve can also be carried out with similar machining accuracy utilizing cutting tool 700.

Figure 9A:
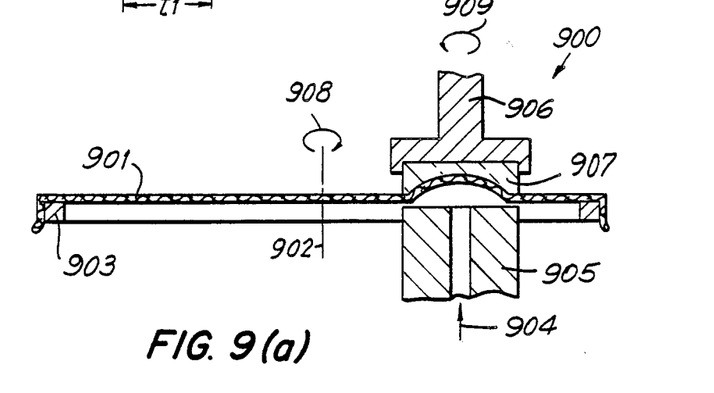

Reference is now made to FIG. 9(a) in which a polishing tool generally indicated at 900, for optical polishing of the surfaces of the base curve and the bevel formed by cutting tool 700 is shown. A polishing cloth 901 is rotatably mounted about the center of rotation 902 of a rotary ring 903. Cloth 901 is an abrasive cloth made of a soft material which is deformable into any shape. Cloth 901 is pressed substantially uniformly against the surface of a work 907 which is blocked to a blocking tool 906 by the pressure of a fluid, such as compressed air. The fluid is blown against the back side of cloth 901 through a nozzle 905 as illustrated by arrow 904. Polishing tool 900 polishes work 907 while supplying an abrasive agent onto the surface of polishing cloth 901. The surface of the base curve and the surface of the aspherical bevel are polished concurrently by rotating the rotary ring 903 in the direction of arrow 908 and at the same time rotating the work 907 in the direction of arrow 909, a direction opposite to the direction of rotation of rotary ring 903.

The material of polishing cloth 901 need not be limited as long as it is deformable into any shape, and has moderate resiliency and some degree of softness so that it does not damage the surface being polished. The efficiency of abrasion, i.e. the time necessary for abrasion and the uniformity of abrasion depend on the relative speed between the polishing cloth 901 and the surface being polished. The efficiency of abrasion is determined by the rotational speeds of rotary ring 903 and work 907, the fluid pressure and the like. In an exemplary embodiment, the rotational speed of rotary ring 903, although differing depending on the outer diameter of the rotary ring, should desirably fall within the range of about 0.5 to 5 rpm where the outer diameter is 30 cm, and the desirable rotational speed of work 907 is within the range of about 1.5 to 25 rpm. The fluid pressure should desirably fall within the range of about 1 to 5 $Kg/cm^2$. Within these parameters, it is possible to obtain a desired optical surface in an abrasion time of 15 to 30 seconds.

Utilizing a polishing tool 900 having a rotary ring 903 outer diameter of 30 cm, a rotational speed of 1 rpm, and a work 907 rotational speed of 3 rpm, a desired optical surface was obtained in about 25 seconds through polishing by using a commercial polishing cloth backed with a polyethylene sheet as the polishing cloth. A powder of $Al_2O_3$ dispersed in water was supplied as the abrasive agent. Polishing cloth 901 was pressed against a work 907 having an outer diameter of 12.5 mm and base curve radius of curvature of 7.80 mm by applying a compressed air stream of 2.0 $Kg/cm^2$ pressure.

As described above, using a polishing tool 900, it is possible to uniformly press polishing cloth 901 against a contact lens using fluid pressure even where the base curve and bevel may have a variety of shapes. The polishing can be carried out with high accuracy, and there is no need to prepare any specialized polishing tool corresponding in shape to the surface being polished in contrast to the prior art, eliminating the step of changing such a tool for each lens. Accordingly, it becomes possible to remarkably reduce the manufacturing cost necessary for the polishing step. Further, it becomes possible to quickly deal with any lenses including special non-uniform shapes as in the case of made to order products.

The above example was directed to the base curve and bevel. However, the polishing of the front curve and the lentic curve can be carried out in a similar manner.

Figure 9B:
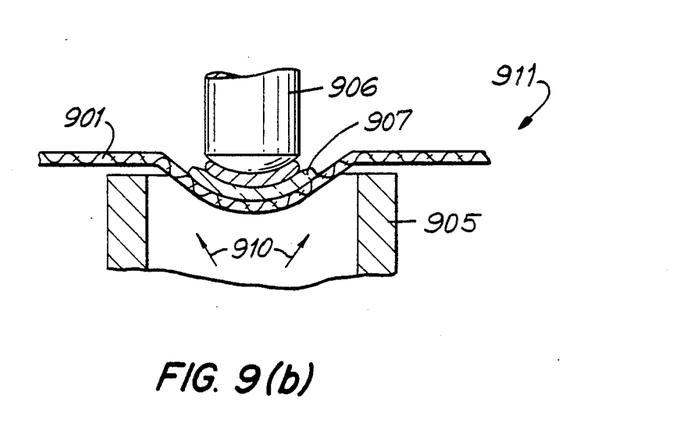

Reference is made to FIG. 9(b) in which a polishing tool 911 for polishing the front curve and lentic curve is shown. Like numerals are used to indicate like structure. The primary differences between polishing tool 900 and polishing tool 911 is that the front curve is convex in a central portion in contrast to the base curve, resulting in a relatively low fluid pressure in a peripheral portion tending to make it impossible to provide a uniform pressing force. Accordingly, the inner diameter of nozzle 905 is made larger than the outer diameter of work 907 so that the fluid can be blown uniformly against the entire surface being polished as illustrated by the arrows 910. With wider nozzle 905, a similar degree of polishing accuracy to that of the polishing of the base curve was obtained in a similar time.

Figure 10:
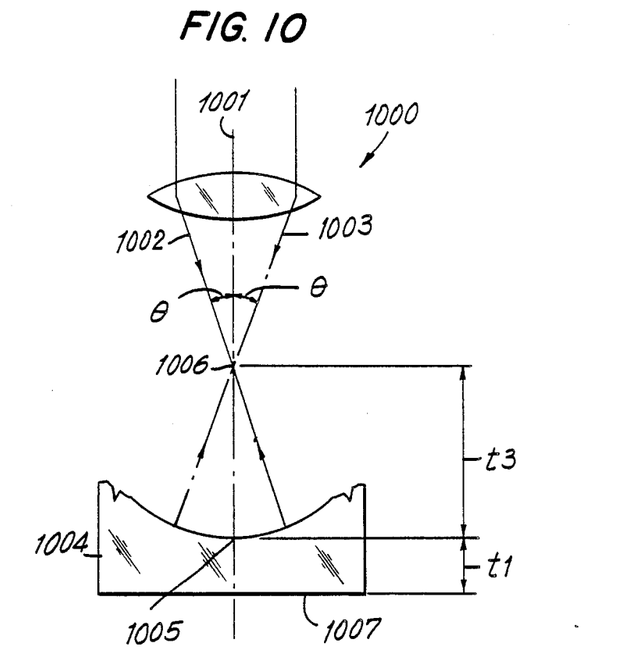
FIG. 10 is a schematic diagram illustrating a measuring method for measuring the radius of curvature of a base curve in accordance with the present invention.

Reference is now made to FIG. 10 wherein a structure, generally indicated at 1000, for measuring the radius of curvature of the base curve in accordance with the invention is provided. The measuring method uses an optical radius-of-curvature measuring device 1000. Device 1000 includes an optical system for generating a spherical light wave having a focal point 1006 and traveling in parallel relative to a center line 1001. The light wave is configured so that where beams 1002 and 1003, inclined from a center line 1001, symmetrically enter and reflect and when they reflect along their incident paths (as shown), a reticular target is clearly focused. Therefore, when an optical center 1005 of a work 1004 is at the focal point 1006, the incident beams 1002 and 1003 reflect to the opposite sides of work 1007. Conversely, when optical center 1005 of work 1004 is spaced away from focal point 1006 by a distance corresponding to the radius of curvature, incident beams 1002 and 1003 reflect along their incident paths as shown. Therefore, the radius of curvature can be obtained by measuring the distance $t_3$ between the two points at which the reticular target is clearly focused. Further, the distance $t_1$ from optical center 1005 to a front-side end surface 1007 can be readily measured.

Using this measuring method, it becomes possible to measure the radius of curvature of the base curve with an accuracy of ±0.002 mm. Additionally, by calculating the radius of curvature of the front curve based upon the foregoing measurement result and machining work 1004 based upon the result, it becomes possible to manufacture the contact lens having a desired power with a yield of more than 99%. Similarly, by measuring the distance $t_1$ from optical center 1005 to front-side end surface 1007, it becomes possible to eliminate thickness error arising during the machining of the base curve. Similarly, it becomes possible to manufacture a contact lens having a desired center thickness with a yield of more than 99%.

As shown in FIG. 10, the radius of curvature of the base curve can be obtained by shifting work 1004 downward beyond an intersection point 1006. Similarly, the radius of curvature of the front curve can be obtained by shifting the work upward in the reverse direction.

Figures 11, 12:
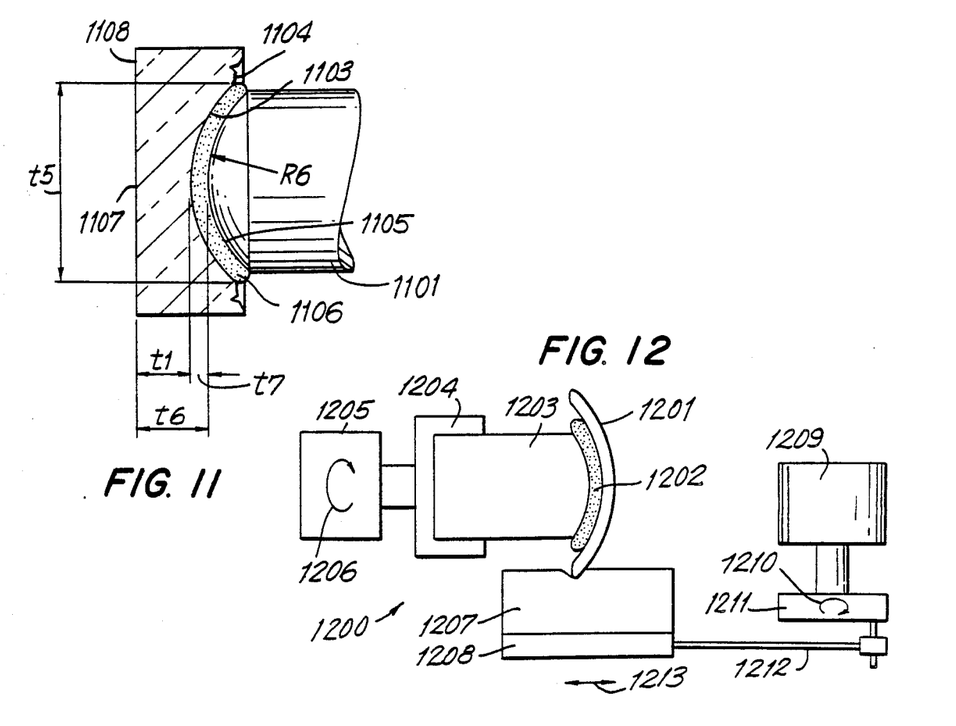
FIG. 11 is a, schematic diagram illustrating a work blocking method according to the present invention.
FIG. 12 is a schematic diagram of an edging tool constructed in accordance with the present invention.

Reference is now made to FIG. 11 wherein a blocking structure for blocking the work with a machined base curve and the bevel prior to the machining and forming of the front curve and the lentic curve in accordance with the invention is provided.

Mounting tool 1101 has a given outer diameter and a bonding surface 1105 of given radius of curvature $R_6$. Bonding surface 1105 is used irrespective of the shape of a base curve 1103 and of a bevel 1104 of a work 1102. In an exemplary embodiment, mounting tool 1101 has an outer diameter of 7.00 mm and the radius of curvature $R_6$ of bonding surface 1105 is 7.30 mm. Work 1102 is blocked to mounting tool 1101 with an adhesive agent 1106. Adhesive agent 1106 must have thermoplasticity to facilitate separating the work 1102 from mounting tool 1101 after machining. It is preferable that it have high viscosity and exhibit only a small variation in volume during cooling and solidifying for the purpose of improving the positioning accuracy at the time of blocking. In an exemplary embodiment, a mixture of paraffin, colophony, EVA, and the like was used.

The blocking method of the embodiment is characterized in that a thickness $t_7$ of a bonding portion is calculated on the basis of the radius of curvature of a base curve 1103 of work 1102 and its effective diameter $t_5$, and the distance $t_1$ from an optical center 1107 to a front-side end surface 1108 of work 1102 so as to make the distance $t_6$ from bonding surface 1105 of mounting tool 1101 to front-side end surface 1108 of work 1102 constant. The amount of adhesive agent required is calculated and obtained based upon the volume of space determined by the outer diameter of fixture 1101, the radius of curvature of bonding surface 1105, the radius of curvature of base curve 1103 and its outer diameter $t_5$, and the thickness $t_7$ of the bonding portion. Consequently, the thus obtained adhesive agent amount is precisely discharged from a storage container or the like and dropped on the center of bonding surface 1105 of fixture 1101. The work 1102 is depressed to a given height, and then, adhesive agent 1106 is solidified.

In this way, it becomes possible to make the height of adhesion or the distance $t_6$ from the bonding surface 1105 to the front-side end surface 1108 constant irrespective of the lens shape or machining error of base curve 1103 of work 1102. This is due to the fact that only the necessary amount of adhesive agent was calculated based upon the shape of mounting tool 1101 and of work 1102 making it possible to machine the front curve and center thickness to a desired shape and value with very high accuracy.

Further, since it has become possible to make an outer end portion of the adhesive agent 1106 match with the connecting portion between base curve 1103 and bevel 1104, it was not necessary to perform re-mounting for edging after the front curve and the lentic curve have been machined. Accordingly, edging could be carried out under the preceding blocked condition preventing the edge portion from obtaining any eccentrical defectiveness.

In this embodiment, the adhesive agent discharge amount is controlled so that the outer end portion of adhesive agent 1106 is not located inside a blending zone between base curve 1103 and bevel 1104 or so that the outer end portion of the adhesive agent 1106 protrudes at least 0.1 to 0.2 mm beyond the blending zone even where the amount of the adhesive agent is appreciably small. This control is done in consideration of machining and measurement errors of the radius of curvature and the outer diameter of the base curve as well as errors in adhesive discharge amount.

If the outer end portion of the adhesive agent is located inside the blending zone, stress is imposed on the work during cutting and/or polishing of the front curve and the lentic curve. As a result, the optical surface of the base curve is deformed causing minute optical distortion. Although optical distortion appearing in the bevel is irrelevant because the bevel has no optical function, such distortion appearing in the base curve portion degrades the optical function of the contact lens, resulting in optical problems.

During blocking, as described above, the amount of adhesive agent is controlled so that the outer end portion of the adhesive agent protrudes outward from the blending zone between the base curve and the bevel. Therefore, the foregoing problem does not occur. Further, since the adhesive agent is confined to within the circumference of the contact lens, re-mounting of the lens is not required during edging. Thus, it becomes possible to simplify the manufacturing process and remarkably enhance the machining accuracy and the yield.

Reference is now made to FIG. 12 in which an edging tool for machining the shape of the circumferential end or edge of the contact lens into a smooth curved surface generally indicated as 1200 and constructed in accordance with the present invention is provided.

A spindle 1205 rotatably supports a collet chuck 1204. A mounting tool 1203 having adhesive agent 1202 on one end is supported within collet chuck 1204. A work 1201 is secured to mounting tool 1203 with adhesive agent 1202 using the blocking method shown in FIG. 11. The front curve and lentic curve have been machined and shaped. Spindle 1205 rotates collet chuck 1204 a speed of about 6000 rpm in the direction of arrow 1206 in turn causing rotation of work 1201.

A rotary disk 1211 is mounted on a drive motor 1209. A crank shaft 1212 is coupled to rotary disk 1211 at one end and a holder 1208 at another. A soft abrasive material 1207 having resilient properties is held by holder 1208. Polishing material 1207 is formed of moltplane, urethane foam or the like. Polishing material 1207 is pressed against work 1201 with a given pressing force by a pressing member (not shown). Rotary disk 1211 is rotated in the direction of arrow 1210 causing reciprocating motion for holder 1208 in the direction of arrow 1213. Accordingly, the edge of work 1201 can be machined into a desired smooth curved surface by reciprocating the polishing material 1207 about four times per second across a distance of about 10 mm.

Although the edge of work 1201 extends into polishing material 1207 to deform polishing material 1207 as shown, the shape of the edge can be changed by varying the extent of deformation by controlling the pressing force of the pressing member. The curved surface on the front curve side may also be differentiated from that on the base curve side by changing the pressing force between the forward and the backward strokes of polishing material 1207. By utilizing polishing tool 1200, it becomes possible to automatically form the edge in a given shape by controlling the pressing force of the abrasive material.

By the use of the machining tools for cutting, polishing, and the like as described above, it becomes possible to readily manufacture desired contact lenses with high accuracy without relying on the experience and expertise of skilled workers. Additionally, the desired power is almost always obtained causing no decrease in yield, and a high machining accuracy can now be obtained even with respect to the base curve and the bevel which require very strict accuracy. Thus, it becomes possible to enhance the overall yield to 96% or more, in contrast to the prior art.

Further, an unmanned automated manufacturing line can be realized by connecting the individual machining tools with auto convey structure effecting a centralized control using a controller such as a computer.

Figure 13:
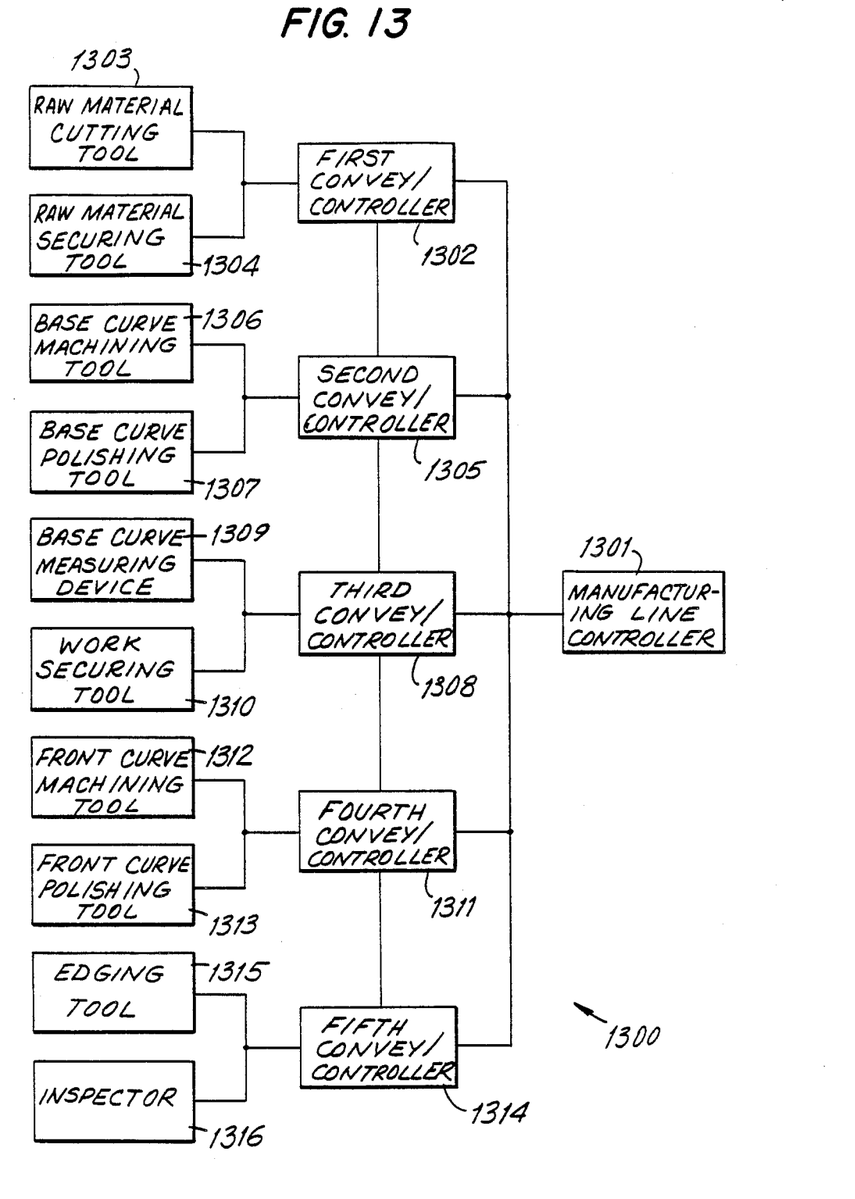
FIG. 13 is a block diaqram of an automated contact lens manufacturing line constructed in accordance with the present invention.

Reference is now made to FIG. 13 in which an automated manufacturing line generally indicated as 1300, constructed in accordance with the invention is provided.

The specification data of contact lenses based on the orders from retail shops and eye hospitals and based on the stock conditions, and other data, such as delivery date and client (delivery place), necessary for production management are input to a manufacturing line controller 1301. The specification data includes various data relating to the shape of contact lens necessary to meet the patient's prescription. For example, the diameter of the lens, the base curve, and the power for standard products, and additionally, the radius of curvature and the width (inner diameter) of the secondary curve, the radius of curvature and the width (inner diameter) of the peripheral curve, the radius of curvature of the lentic curve, the center thickness, and the smoothness of blend for each made to order product is provided. Further, additional data relating to the material of the contact lens that indicates, for example, whether it is hard or soft is input. The manhour requirement for data entry can be reduced if the specification data of standard products is previously stored in the manufacturing line controller 1301 and if a necessary data part is retrieved upon designation of an item code.

Manufacturing line controller 1301, having the data of various contact lenses previously stored therein, sends a manufacturing instruction to each of a plurality of convey/controllers in the order of delivery date. A first convey/controller 1302 selects a contact lens raw material rod of designated material and conveys the rod to a raw material cutting tool 1303 in accordance with an instruction from the manufacturing line controller 1301. Raw material cutting tool 1303 cuts the contact lens raw material into button works of certain size as shown in FIG. 6(a), and a raw work securing tool 1304 bonds and secures the button to a mounting tool as shown in FIG. 6(b). First convey/controller 1302 conveys the thus blocked work to a second convey/controller 1305.

When the work is conveyed from first convey/controller 1302, second convey/controller 1305 requests the specification data relating to that work from manufacturing line controller 1301 and calculates the design data relating to the definite shape of the base curve and of the bevel based upon the specification data received. In the case of standard products, the design data relating to the optimum shape of the bevel is calculated in accordance with a preset expression based upon the outer diameter of the lens and the radius of curvature of the base curve. In second convey/controller 1305 some data may be selected from the data relating to the shape of the bevel that is previously stored per item rather than calculating from an expression.

A base curve machining tool 1306 machines and forms the base curve and the bevel using cutting tool 700 based upon the calculated design data. A base curve polishing tool 1307 polishes the surfaces of the thus formed base curve and bevel using polishing tool 900. The work having been polished is conveyed to a third convey/controller 1308.

Third convey/controller 1308 conveys the work received to a base curve measuring device 1309. Base curve measuring device 1309 measures the radius of curvature of the base curve and the like using the method as shown in FIG. 10 and sends the measurement result to manufacturing line controller 1301. A work securing tool 1310 secures the work to a blocking tool using the method as shown in FIG. 11 based upon the measurement result. Of course, the blocking tool secured by the raw work securing tool 1304 is removed before the foregoing processing. Third convey/controller 1308 conveys the thus mounted work to a fourth convey/controller 1311.

When the work is conveyed from third convey/controller 1308, the fourth convey/controller 1311 requests the specification data relating to that work and the measurement result obtained by the base curve measuring device 1309 from manufacturing line control means 1301. Then, based upon the specification data and the measurement result, the radius of curvature of the front curve for attainment of a desired power and the radius of curvature of the lentic curve for attainment of a desired edge thickness are calculated to obtain the design data relating to the definite shape of the front curve and of the lentic curve.

A front curve machining tool 1312 machines and forms the front curve and the lentic curve using cutting tool 700 based upon the calculated design data. A front curve polishing tool 1313 polishes the surfaces of the thus formed front curve and lentic curve using the method shown in FIG. 9(b). The work having been polished is conveyed to a fifth convey/controller 1314.

Fifth convey/controller 1314 conveys the thus received work to an edging tool 1315. Edging tool 1315 machines and forms the edge into a smooth curved surface using the method as shown in FIG. 12. An inspector 1316 inspects the shape, power, presence/absence of scratch, etc. of each curved surface of the contact lens having been machined, and provides an inspection result to the manufacturing line controller 1301. The power can be automatically measured using a well-known lens meter, and the shape, presence/absence of scratch, etc. of each curved surface can automatically be inspected using an optical projector and a picture processing device. Manufacturing line controller 1301 judges the acceptance/rejection of the products on the basis of the inspection result and if necessary, provides an instruction of re-manufacture. In this way, the situation of a defective product can be dealt with quickly.

In addition to the foregoing functions, the individual convey/controllers have the following functions. When the specification data for a lens of high priority is entered during the course of manufacture, the manufacturing line controller 1301 instructs each convey/controller to machine this lens first. In response to this instruction, each convey/controller keeps the work previously received on standby and conveys the high priority work to each machining tool, polishing tool, or the like. In this way, high priority lenses can be manufactured in a very short time by controlling each convey/controller in the foregoing manner.

As described above, manufacturing line 1300 can manufacture the contact lenses of any material and any special shape without any modification of the manufacturing line. Additionally, it can manufacture those lenses classified as a typical multi-item small-quantity item at low costs. Further, some made to order products which hitherto needed three days from order to delivery can be delivered on the next day or on the same day except for remote places. The only limitation becomes the delivery system to each final destination.

Although the embodiment has shown herein the method of machining the side of the base curve first, the present invention should not be limited to such a method. The side of the front curve may be machined first, or the machining of the edge may be carried out concurrently with the machining of the side of the base curve or the front curve, either case leading to the same effectiveness.

By first machining a curved surface to form the base curve, and then measuring the front curve, the shape of the surface then being machined is determined based on the measurement result. Thus, it becomes possible to manufacture a contact lens having a desired power with very high accuracy irrespective of whether the contact lens is a standard lens or made to order lens having curved surfaces of specific shapes.

Further, by machining the base curve and the bevel concurrently in the same step, it becomes possible to form a base curve and a bevel which require a very severe shape accuracy with very high machining accuracy, and it becomes possible to machine the base curve and the bevel of any shaped lens accuracy utilizing substantially the same manhour inputs.

Further, since the machining means is adapted to deal with all contact lenses having various specifications, it is possible to quickly deal with various requests from users in relation to various specifications and thereby manufacture desired contact lenses. Accordingly, the quality of the contact lens can be enhanced, the manufacturing cost can be reduced, various contact lenses satisfying a variety of patient's prescriptions can be manufactured and any contact lens prescription can be filled.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A method for manufacturing a contact lens having a base curve, bevel and front curve by machining a contact lens raw material to a desired shape based upon design data comprising the steps of:

forming said base curve and said bevel curve in said contact lens material having said desired shape based upon said design data;

measuring a radius of curvature of said base curve;

calculating a radius of curvature data of said front curve necessary to form a contact lens of a desired power based upon said radius of curvature of said base curve; and forming said front curve having a shape based upon the calculated radius of curvature data.

2. The method of manufacturing a contact lens of claim 1, further comprising the steps of:

determining whether a lentic curve must be formed and forming said lentic curve having a shape based upon said calculated radius of curvature if it is determined that a lentic curve is required.

3. A method for manufacturing a contact lens having a base curve, bevel and front curve by machining a contact lens raw material to a desired shape based upon design data comprising the steps of:

forming said front curve to a desired radius of curvature based upon said design data;

measuring the radius of curvature of said front curve;

calculating the radius of curvature data of said base curve necessary to form a contact lens of a desired power based upon said radius of curvature of said front curve; and forming said base curve and said bevel curve to a shape based upon said calculated radius of curvature.

4. The method of manufacturing a contact lens of claim 3, further comprising the steps of:

determining whether a lentic curve must be formed and forming said lentic curve having a shape based upon said calculated radius of curvature if it is determined that a lentic curve is required.

5. A method of manufacturing a contact lens having a base curve, bevel and front curve by machining a contact lens raw material to a desired shape based upon design data and utilizing a soft polishing cloth comprising the steps of:

forming said base curve and said bevel having desired shapes by cutting said raw material based upon said design data;

polishing a surface of said base curve and a surface of said bevel by pressing a soft polishing cloth into contact with a surface of said base curve and said bevel with fluid pressure so that said polishing cloth follows the curvature of said base curve and causing relative motion between said raw material and said polishing cloth;

forming said front curve to a desired shape by cutting said raw material based upon said design data; and polishing a surface of said front curve by pressing said soft polishing cloth into contact with a surface of said front curve with fluid pressure so that said polishing cloth follows the curvature of said base curve and causing relative motion between said raw material and said polishing cloth.

6. The method for manufacturing the contact lens of claim 5, further comprising the steps of:

determining whether a lentic curve is necessary;

forming a lentic curve, if it is determined to be necessary, by cutting said raw material based upon a design data; and polishing said surface of said lentic curve by pressing said soft polishing cloth against said surface of said lentic curve with fluid pressure and causing relative motion between said raw material and said polishing cloth.

7. A method for manufacturing a contact lens having a base curve, bevel and front curve by machining a contact lens raw material to a desired shape based upon design data utilizing a mounting tool comprising the steps of:

forming a base curve and said bevel having desired shapes by cutting said raw material based upon said design data;

polishing a surface of said base curve;

polishing of said bevel;

blocking said raw material to said mounting tool by calculating an amount of adhesive necessary to mount said raw material to said mounting tool based upon the shape of said base curve, the shape of said mounting tool and the height of adhesion and discharging the calculated necessary amount of adhesive between said polished surface of said base curve and said mounting tool;

forming said front curve to a desired shape based upon said design data;

polishing a surface of said front curve; and edging said contact lens raw material to a smooth curve surface.

8. The method for manufacturing a contact lens of claim 7 further comprising the steps of:

determining whether a lentic curve is to be formed; and forming said lentic curve if necessary by cutting said raw material based upon said design data.

* * * * *